T. GAGGS.
REFLECTOR FOR STORE WINDOWS AND THE LIKE.
APPLICATION FILED AUG. 19, 1909.
974,374.
Patented Nov. 1, 1910.
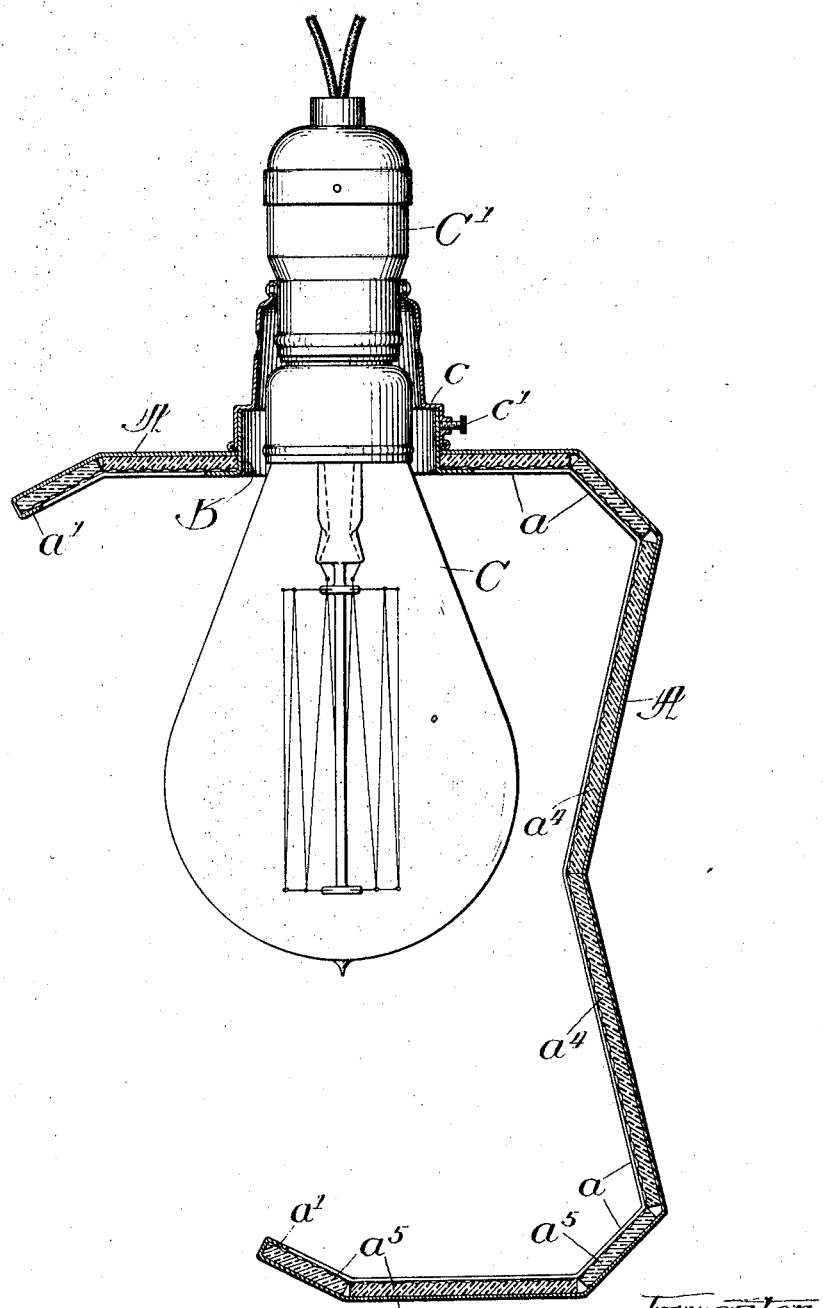
Witnesses:
F. N. Daggett.
L. A. Norton
Inventor:
Thomas Gagge
by Peirce & Fisher
Attys.

UNITED STATES PATENT OFFICE.

THOMAS GAGGS, OF CHICAGO, ILLINOIS, ASSIGNOR TO THOMAS H. SIDLEY, OF CHICAGO, ILLINOIS.

REFLECTOR FOR STORE-WINDOWS AND THE LIKE.

974,374.

Specification of Letters Patent. Patented Nov. 1, 1910.

Application filed August 19, 1909. Serial No. 513,553.

*To all whom it may concern:*

Be it known that I, THOMAS GAGGS, a citizen of the United States, residing at Chicago, in the county of Cook and State of Illinois, have invented certain new and useful Improvements in Reflectors for Store-Windows and the Like, of which I do declare the following to be a full, clear, and exact description, reference being had to the accompanying drawing, forming part of this specification.

The present invention has for its object to provide an improved construction of reflector specially designed for more effectively displaying the merchandise within store windows, show-cases, or in like situations, although obviously susceptible of use for other purposes.

The invention consists in the features of novelty hereinafter described, illustrated in the accompanying drawing and particularly pointed out in the claims at the end of this specification.

The accompanying drawing is a transverse section of the preferred form of the invention.

The preferred form of my invention comprises a metallic frame or backing A for containing the several reflecting glasses that line the interior of the reflector. As shown, the backing A is formed at its sides with reverted flanges $a$ and at its ends with similar flanges $a'$ that serve to effectively retain the reflecting glasses in position. The upper part of the main frame A is of inverted, trough-shaped formation, this upper part being preferably, although not essentially, of polygonal outline. The back portion of the main frame is inwardly bent or arched toward the lamp, and the lower portion of the main frame is of trough-like shape, but extends inwardly to a less extent than the trough-shaped upper portion of the main frame. The upper portion of the main frame is shown as lined with a plurality of reflecting glasses or mirrors (preferably of corrugated glass) and through this upper portion of the main frame extends a flanged collar B through which will project the upper part of the lamp C. This lamp C is preferably an incandescent electric lamp of the tungsten type, and the socket C' of this lamp is furnished with a hood or collar $c$ that encircles the upper portion of the collar B and is secured thereto by means of set screws $c'$. The back plate or portion of the main frame A, which is reversely arched or curved, is lined with reflecting glasses or mirrors $a^4$ and the apex of this back plate will extend opposite the lower portion of the lamp C. The trough-like bottom portion of the main frame being shown of polygonal outline, is lined with glass plates or mirrors $a^5$, the outer one of these lower reflecting mirrors $a^5$ extending inwardly and upwardly to a point slightly beyond the vertical center of the lamp. The downwardly turned portions of the upper part of the reflector and the upwardly turned portions of the lower part of the reflector are made narrow so that these trough-shaped parts are shallow.

In illuminating a store window, my improved reflector is preferably installed at the front and top adjacent the center of the window. The light from the lamp C is most effectively reflected and distributed by the several reflecting glasses in the upper and lower trough-shaped portions of the reflector and at the back portion thereof. By forming the reflector with an inwardly bowed or arched back portion, the light from the lamp, striking the reversely disposed mirrors $a^4$ which line this back portion, is reflected up into the trough-like upper portion of the reflector and down into the trough-like lower part thereof; while the light striking the mirrors in the upper and lower trough-like parts of the reflector is thrown back upon the reflecting mirrors at the back and most effectively reflected by them.

I am aware that it has been heretofore proposed to mount a lamp in a trough-shaped reflector, but it has never been heretofore proposed to mount a lamp within a reflector having upper and lower trough-shaped portions, nor such upper and lower trough-shaped portions with an intermediate bowed or arched back plate.

Having thus described my invention, what I claim as new, and desire to secure by Letters Patent, is:—

1. A reflector for store windows and the like comprising an upper, downwardly facing, trough-shaped top, a lower, upwardly facing, trough-shaped bottom, a back wall connecting said top and said bottom, said top, bottom and back wall having reflecting surfaces disposed at an angle to one another, and a lamp-holder mounted on said reflector for supporting an electric incandescent lamp in pendent position in front of said back wall, substantially as described.

2. A reflector for store windows and the like comprising top, bottom and back connecting walls having inner reflecting surfaces disposed at an angle to one another, said top wall having a down-turned lip at its free edge and said bottom wall having an up-turned lip at its free edge, and means secured to the reflector for supporting an electric lamp in pendent position in front of said back wall, substantially as described.

3. A reflector for store windows and the like, comprising a downwardly facing, trough-shaped upper part, an upwardly facing, trough-shaped lower part of less width than said upper part, and a reflecting back plate connecting said upper and lower parts, said upper trough-shaped part having a holder for supporting a lamp in pendent position in front of said back plate, substantially as described.

4. A reflector for store windows and the like, comprising a downwardly facing, trough-shaped upper part, an upwardly facing, trough-shaped lower part and an inwardly arched reflecting back wall extending between said upper and lower parts.

5. A reflector for store windows and the like, comprising an upper, inverted, trough-shaped top provided with an opening to admit a lamp, a lower, upwardly facing, trough-shaped bottom portion and an inwardly arched, connecting wall between said upper and lower parts.

6. A reflector for store windows and the like, comprising a downwardly facing, trough-shaped upper portion, an upwardly facing, trough-shaped lower portion, an inwardly arched wall connecting said upper and lower portions and a centrally disposed holder for supporting a lamp in pendent position in front of said connecting wall.

7. A reflector for store windows and the like, comprising an upper, shallow, trough-shaped portion, a lower, shallow, trough-shaped portion of less width than said upper trough-shaped portion, means for holding a lamp in pendent position from said upper portion and a connecting wall extending between said upper and lower portions and inclining reversely from about its center.

8. A reflector for store windows and the like, comprising a top having narrow, downwardly inclined, front and rear edge portions, a bottom having narrow, upwardly inclined, front and rear edge portions, said bottom being of less width than said top, and a connecting wall between said top and bottom portions and having reversely inclined surfaces.

THOMAS GAGGS.

Witnesses:
MARGARET ELLEN GAGGS,
RICHARD S. TUTHILL, Jr.